(12) United States Patent
St. Romain, II et al.

(10) Patent No.: US 9,947,085 B2
(45) Date of Patent: Apr. 17, 2018

(54) SYSTEM AND METHOD FOR IMPROVING AN IMAGE CHARACTERISTIC OF IMAGE FRAMES IN A VIDEO STREAM

(71) Applicant: Digital Signal Corporation, Chantilly, VA (US)

(72) Inventors: Randall J. St. Romain, II, Clifton, VA (US); Ambrose J. Slone, Ashburn, VA (US); Péter L. Venetianer, McLean, VA (US)

(73) Assignee: Digital Signal Corporation, Chantilly, VA (US)

( * ) Notice: Subject to any disclaimer, the term of this patent is extended or adjusted under 35 U.S.C. 154(b) by 0 days.

(21) Appl. No.: 14/941,882

(22) Filed: Nov. 16, 2015

(65) Prior Publication Data

US 2016/0328831 A1 Nov. 10, 2016

Related U.S. Application Data

(63) Continuation of application No. 14/245,853, filed on Apr. 4, 2014, now abandoned.

(51) Int. Cl.
*G06K 9/40* (2006.01)
*G06T 5/00* (2006.01)
*G06T 5/40* (2006.01)
*G06T 5/50* (2006.01)

(52) U.S. Cl.
CPC .............. *G06T 5/009* (2013.01); *G06T 5/008* (2013.01); *G06T 5/40* (2013.01); *G06T 5/50* (2013.01); *G06T 2207/10016* (2013.01); *G06T 2207/20224* (2013.01)

(58) Field of Classification Search
USPC ....... 382/274, 169, 254, 276, 266, 294, 124, 382/281; 348/672, 678, E5.073; 358/3.26, 3.27; 359/455, 619, 621; 600/443
See application file for complete search history.

(56) References Cited

U.S. PATENT DOCUMENTS 6,130,724 A * 10/2000 Hwang .................... H04N 5/20
348/672
7,102,697 B2 * 9/2006 Lei .......................... G06T 5/009
348/678

* cited by examiner

*Primary Examiner* — Anh Do
(74) *Attorney, Agent, or Firm* — Toering Patents PLLC

(57) ABSTRACT

According to various implementations of the invention, a changed region between a later-in-time image frame and an earlier-in-time image frame and an unchanged region between such two image frames are determined. A new improvement to the video characteristic is determined and applied to the changed region of the later-in-time image frame. A prior improvement to the video characteristic that was determined for the earlier-in-time image frame is applied to the unchanged region of the later-in-time image frame.

19 Claims, 5 Drawing Sheets

US 9,947,085 B2

SYSTEM AND METHOD FOR IMPROVING AN IMAGE CHARACTERISTIC OF IMAGE FRAMES IN A VIDEO STREAM

CROSS-REFERENCE TO RELATED APPLICATIONS

This Application is a continuation of U.S. patent application Ser. No. 14/245,853, filed on Apr. 4, 2014, entitled "System and Method for Improving an Image Characteristic of Image Frames in a Video Stream," the entirety of which is incorporated herein by reference.

FIELD OF THE INVENTION

The invention is generally related to video processing and more particularly, to improving an image characteristic of an image frame in a video stream based on frame-to-frame changes between image frames in the video stream.

BACKGROUND OF THE INVENTION

Processing video, or more particularly a series of image frames that comprise a video stream, can be computationally intensive, both in terms of time and hardware resources. Many techniques for processing individual images to improve a characteristic of the image frames in the video stream (i.e., an image characteristic) may not be practical in a real-time context of the video stream. For example, certain image processing techniques may require more processing time than what is available in a time interval between consecutive image frames of the video stream or otherwise require expensive or extensive hardware in order to do so.

What is needed is an improved system and method for improving an image characteristic of image frames in a video stream.

SUMMARY OF THE INVENTION

Various implementations of the invention relate to systems and methods for improving an image characteristic of a plurality of image frames in a video stream captured by a video camera, the method comprising: determining a first improvement to the image characteristic for a first frame of the plurality of image frames; determining a changed region of a second frame of the plurality of image frames in relation to the first frame of the plurality of the image frames and an unchanged region of the second frame of the plurality of image frames in relation to the first frame of the plurality of the image frames; determining a second improvement to the image characteristic for the changed region of the second frame of the plurality of image frames; applying the first improvement to the image characteristic of the unchanged region of the second frame of the plurality of image frames; and applying the second improvement to the image characteristic of the changed region of the second frame of the plurality of image frames.

These implementations, their features and other aspects of the invention are described in further detail below.

DETAILED DESCRIPTION

Figure 1:
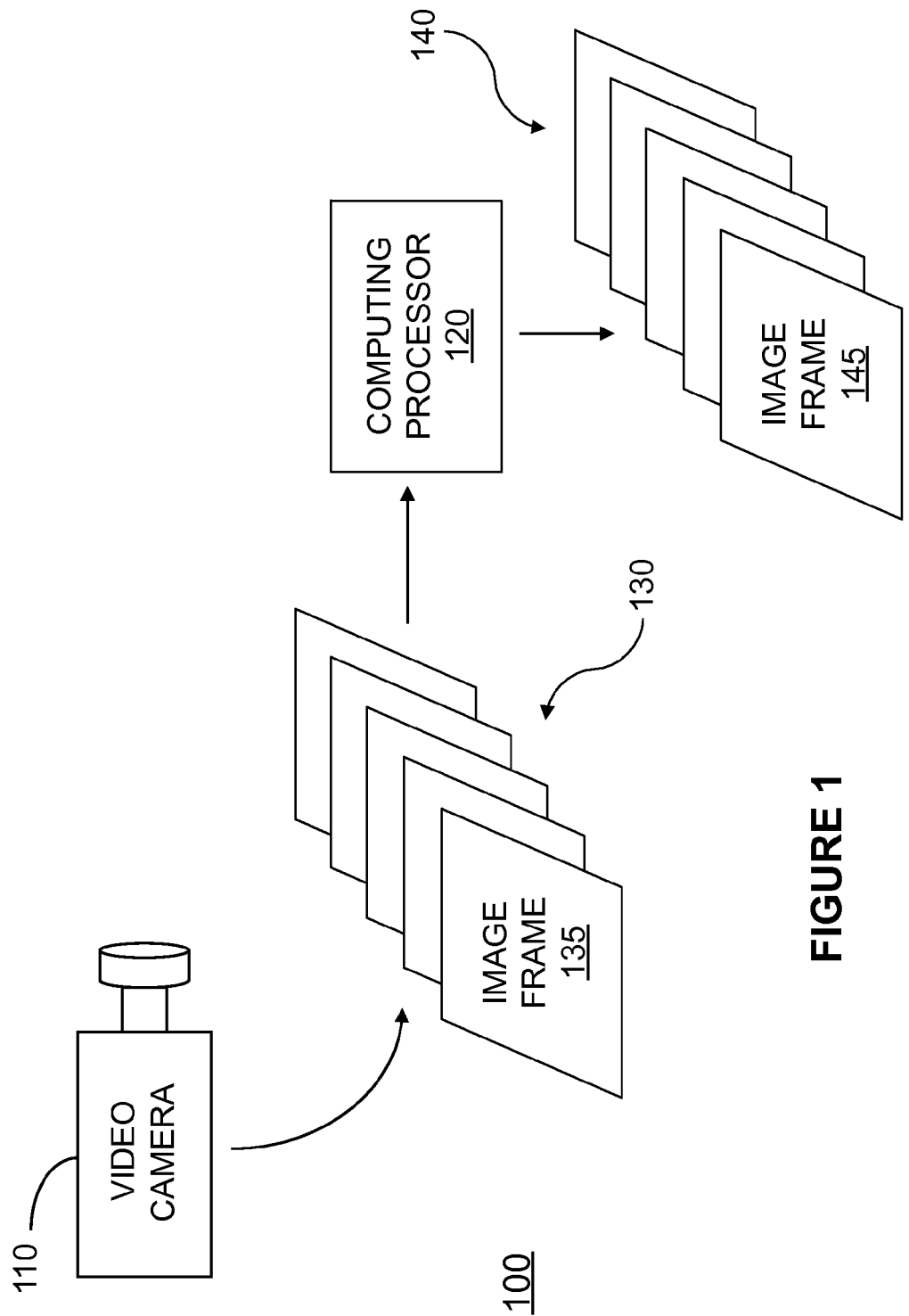
FIG. 1 illustrates a video processing system according to various implementations of the invention.

FIG. 1 illustrates a video processing system 100 according to various implementations of the invention. Video processing system 100 includes a video camera 110 and a computing processor 120. Video camera 110 captures and outputs a video stream 130 comprised of a series of image frames 135 as would be appreciated. Typically, image frames 135 include, or are subject to, an image characteristic that might be modified, enhanced or otherwise improved via additional image processing techniques. Such image characteristics of the image frame might include, but are not limited to, image contrast, image exposure, image color, image saturation, image sharpness, image dynamics range as well as other image characteristics as would be appreciated. Various conventional image processing techniques are available to improve various ones of these image characteristics as would be appreciated.

Computing processor 120 may comprise various hardware, software, firmware and/or any combination thereof that may be configured to perform various functions, including the functions described herein, as would be appreciated. Once so configured, computing processor 120 becomes a particular machine configured to implement various features and aspects of the invention as would be appreciated. Typically, computing processor 120 includes a processor and a memory (not otherwise illustrated), where the memory is configured to store instructions that when executed by the processor implement and/or perform various features and aspects of the invention, again, as would be appreciated.

Computing processor 120 receives video stream 130, typically as a series of image frames 135. According to various implementations of the invention, computing processor 120 determines a changed region between two image frames 135 (i.e., a first image frame and a second frame) and an unchanged region between the two image frames 135. In some implementations of the invention, for the changed region, computing processor 120 determines and applies a new improvement to the image characteristic for the changed region; and for the unchanged region, computing processor 120 applies no improvement to the image characteristic or a prior improvement to the image characteristic for the unchanged region. In accordance with various implementations of the invention, once the respective improvements are applied to their corresponding regions, computing processor outputs an improved video stream 140 including a series of improved image frames 145 having the improved image characteristic.

In some implementations of the invention, a scene, or field, of image frame 135 is large relative to various items of interest that may be captured in image frame 135. Such items of interest may vary as would be appreciated, but may include, for example, objects, vehicles, persons, animals, faces, or other items. Such items of interest may also include various features of the items of interest, such as in the case of a face, may include eyes, irises, ears, nose, nostrils, mouth, chin, etc. Generally speaking, these items of interest may change frame-to-frame whereas the remainder of the scene remains substantially unchanged. As such, in some implementations of the invention, improvements to the image characteristic may only need be updated for or otherwise applied to a relatively small portion of image frame 135.

In some implementations of the invention, the frame-to-frame changes may be due to movement of the item of interest into, out of, or within the scene. In some implementations of the invention, the frame-to-frame changes may be due to changes in the item of interest itself. In other words, the changes may be in the item's appearance even though the item is otherwise stationary within the scene, for example, a person turning their head while standing within the scene. In some implementations of the invention, the frame-to-frame changes may be due to changes in illumination to the whole or parts of the image. In some implementations of the invention, the frame-to-frame changes may be due to a combination of other changes as would be appreciated.

Figure 2:
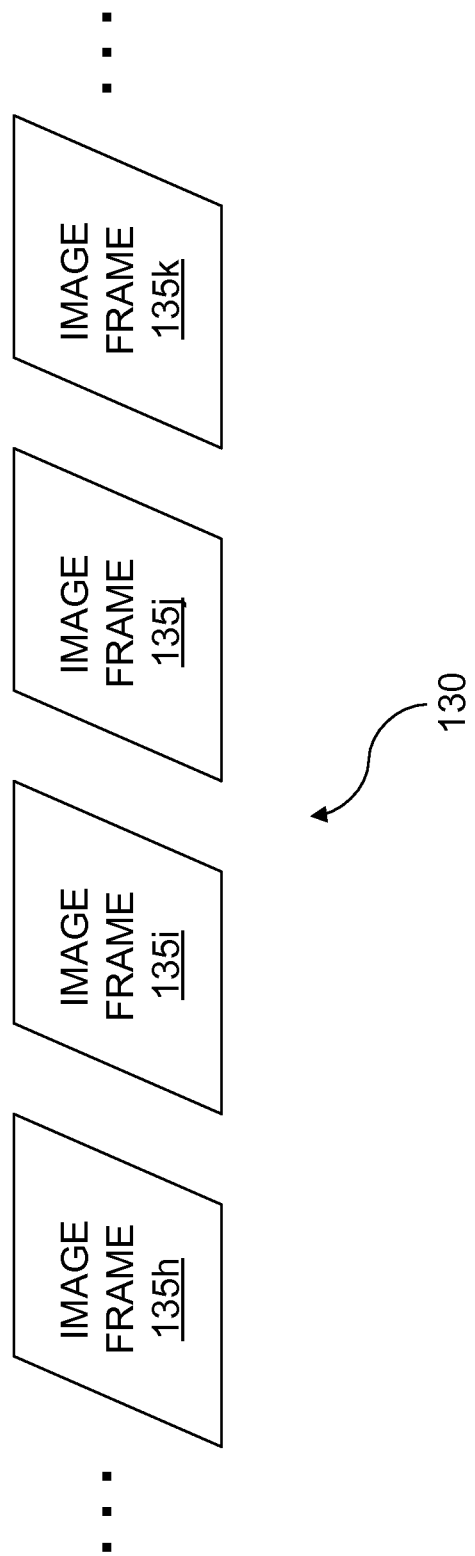
FIG. 2 illustrates a video stream including a sequence of image frames according to various implementations of the invention.

FIG. 2 illustrates video stream 130 including a sequence of image frames 135 (illustrated in FIG. 2 as an image frame 135$h$, an image frame 135$i$, an image frame 135$j$, an image frame 135$k$, etc.). For purposes of this description, image frame 135$k$, for example, is a later-in-time image frame 135 relative to image frame 135$j$ (as well as other image frames illustrated and not illustrated), and image frame 135$j$, for example, is an earlier-in-time image frame 135 relative to image frame 135$k$ (as well as other image frames illustrated and not illustrated).

As discussed above, determining the new improvement to the image characteristic of each image frame 135 in video stream 130 may be computationally intensive such that it is not feasible or otherwise desirable to do so within a time between consecutive image frames 135 of video stream 130. For example, to become feasible to do so, additional or different hardware may be required or sacrifices to other functionality or performance may be required. By determining and applying the new improvement to an area that changes between two image frames and applying the prior improvement or no improvement to an area that doesn't change between two image frames in accordance with various implementations of the invention, some of the image processing (e.g., processing the unchanged region) may be reduced or otherwise eliminated. Thus, in accordance with various implementations of the invention, an overall computational demand on computing processor 120 in connection with improving the image characteristic of image frames 135 of video stream 130 may be reduced.

According to various implementations of the invention, each image frame 135 is divided into regions. In some implementations of the invention, image frame 135 may be divided into a number of regions. In some implementations of the invention, image frame 135 may be divided into a fixed number of regions. In some implementations of the invention, image frame 135 may be divided into a dynamic number of regions depending, for example, on activity within the scene or on the content of the scene of image frame 135. In some implementations of the invention, each region is fixed in size. In some implementations of the invention, each region is fixed in size in accordance with a size of items of interest expected with image frame 135. In some implementations of the invention, each region varies in size depending, for example, on activity within the scene of image frame 135. In some implementations of the invention, each region is a polygon, such as but not limited to a square or other rectangle. In some implementations of the invention, each region is circular or elliptical. In some implementations, each region may overlap with one or more adjacent regions. In some implementations, each region abuts, but does not overlay one or more adjacents regions.

Figure 3:
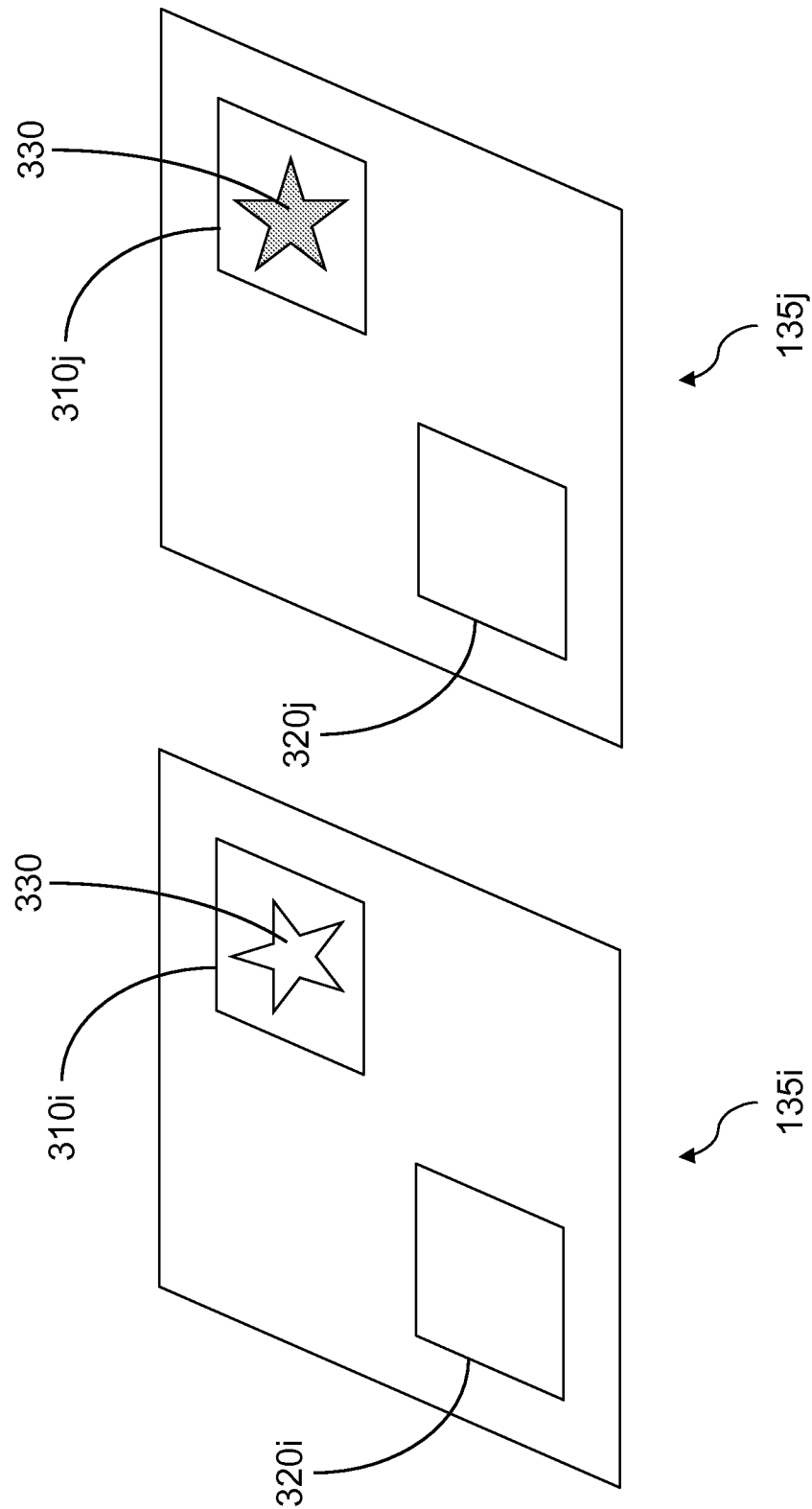
FIG. 3 illustrates a pair of image frames in further detail according to various implementations of the invention.

According to various implementations of the invention, a region from a later-in-time image frame 135 is compared against a corresponding region from an earlier-in-time image frame 135 to detect whether the region is a changed region or an unchanged region. FIG. 3 illustrates two image frames: an earlier-in-time image frame 135$i$ and a later-in-time image frame 135$j$. As illustrated, each image frame 135$i$, 135$j$ captures an "image" of an object 330. As also illustrated, object 330 changes between image frames 135$i$, 135$j$. In image frame 135$i$, object 330 is captured in a region 310$i$; and, in image frame 135$j$, object 330 is captured in a corresponding region 310$j$. According to various implementations of the invention, region 310$j$ is deemed a changed region 310 relative to region 310$i$. Also illustrated in FIG. 3 are a region 320$i$ in image frame 135$i$ and a corresponding region 320$j$ in image frame 135$j$. As illustrated, no changes occur in these two regions; hence, region 320$j$ is deemed an unchanged region relative to region 320$j$. For purposes of clarity, region 310$i$ in image frame 135$i$ corresponds to a same physical section of an image frame as region 310$j$ in image frame 135$j$; likewise, region 320$i$ in image frame 135$i$ corresponds to a same physical section of an image frame as region 320$j$ in image frame 135$j$ As would be appreciated by those skilled in the art, typically no two image frames 135 (or regions within image frames 135) are completely unchanged, due to, for example, but not limited to, noise occurring in the electronics of video camera 110. In some implementations of the invention, a region may be deemed "changed" if the differences between a region of two image frames 135$i$, 135$j$ are substantial and "unchanged" if the differences between the region of two image frames 135$i$, 135$j$ are insubstantial. The degree to which a difference is substantial or insubstantial may be situational and/or implementation specific and/or hardware dependant as would be appreciated by one of ordinary skill in the art. However, by way of example and not limitation, a region may be deemed "unchanged" if fewer than a threshold number of pixels within the region differ by less than a threshold pixel value within a given region between two image frames 135$i$, 135$j$; similarly, the region may be deemed "changed" if more than a threshold number of pixels differ by more than a threshold pixel value within the given region. These thresholds may be fixed or vary depending on the implementation as would be appreciated; further, these thresholds may be set based on various scene factors as would also be appreciated. Still further, various conventional image processing techniques are available to detect whether a change exists between two image frames 135$i$, 135$j$ or regions thereof.

Figure 4:
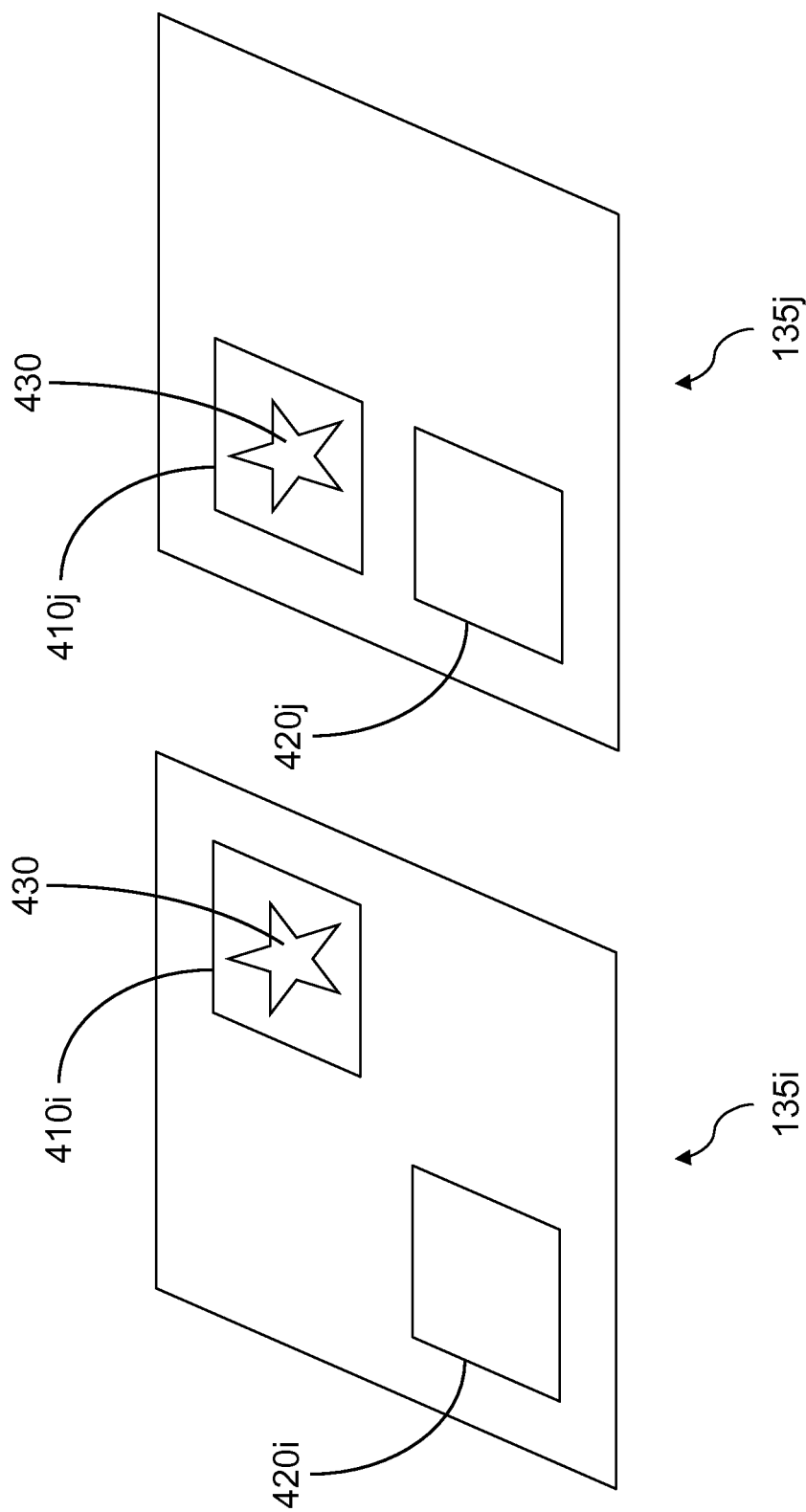
FIG. 4 illustrates a pair of image frame in further detail according to various implementations of the invention.

FIG. 4 illustrates two image frames: an earlier-in-time image frame 135$i$ and a later-in-time image frame 135$j$. As illustrated, each image frame 135$i$, 135$j$ captures an "image" of an object 430. As also illustrated, object 430 changes between image frames 135$i$, 135$j$, and more specifically, translates between these image frames. In image frame 135$i$, object 430 is captured in a region 410$i$; and, in image frame 135$j$, object 430 is captured in a corresponding region 410$j$. Also illustrated in FIG. 4 are a region 420$i$ in image frame 135$i$ and a corresponding region 420$j$ in image frame 135$j$. In FIG. 4, region 410$i$ in image frame 135$i$ corresponds to a different physical section of an image frame as region 410$j$ in image frame 135$j$; whereas region 420$i$ corresponds to a same physical section of an image frame as region 420$j$.

In FIG. 4, a change between image frames 135$i$, 135$j$ may be detected via various motion processing techniques. These conventional techniques identify motion and a trajectory of a target, such as object 430, between image frames. Thus, by knowing a trajectory of object 430 in image frame 135$i$, an estimate of a location of object 430 in image frame 135$j$ may be determined as would be appreciated. According to various implementations of the invention, estimated locations of moving objects 430 may identify changed regions in image frames 135, such as, for example region 410$j$ relative to region 410$i$.

According to various implementations of the invention, the new improvement to the image characteristic is determined and applied to the changed region(s) of the later-in-time image frame 135 (e.g., image frame 135$j$ relative to image frame 135$i$) and the prior improvement to the image characteristic previously determined with regard to the unchanged region(s) for the earlier-in-time image frame 135 (e.g., image frame 135$i$, 135$h$, etc., relative to image framer 135$j$) is applied to the unchanged region(s) of the later-in-time image frame 135. In this manner, the new improvement to the image characteristic is determined only for the changed regions thereby reducing processing required from computing processor 120.

According to various implementations of the invention, the new improvement to the image characteristic is determined and applied to the changed region(s) of the later-in-time image frame 135 and no improvement to the image characteristic is applied to the unchanged region(s) for the earlier-in-time image frame 135. In this manner, the new improvement to the image characteristic is determined only for the changed regions thereby reducing processing required from computing processor 120.

Improvements to the image characteristic of image frames 135 (more specifically, in the context of the invention, to region(s) of image frames 135) vary from a scaling or weighting factor to a complex image transformation, including a two-dimensional image transformation. Accordingly, a manner in which the improvement is applied to various regions of image frame may vary depending on the corresponding image processing technique as would be appreciated. Further, as such image processing techniques may involve a series of intermediate computations, in some implementations of the invention, the prior improvement determined from and/or for an earlier-in-time image frame (or region thereof) may not be the full prior improvement but rather an intermediate computation or series of computations that are particularly computationally expensive. These intermediate computations or results thereof may be stored as the "prior improvement" and when subsequently applied to the later-in-time image frame, the remaining computations may be performed with the intermediate computations or results as initial conditions as would be appreciated. Some of such implementations may advantageously utilize dedicated hardware or software routines such that use of the intermediate computations or results thereof is more convenient than use of the final computations or results.

In some implementations of the invention, the frame-to-frame changes may be due to changes in illumination to the whole or parts of the image as discussed above. For example, relatively uniform changes to lighting, or other illumination, within the scene may effect various regions in the frame in a similar and predictable manner. In other words, an intensity of an individual pixel in a region of the frame may change but its value relative to other pixels in the region will stay roughly the same. For such changes, the entire improvement may not have to be recalculated. Instead, a simple transformation, such as scaling or shifting, may suffice as would be appreciated.

In some implementations, applying the "prior improvement" to the unchanged region of the later-in-time image frame 135 may comprise simply replacing the region of later-in-time image frame 135 with the corresponding improved region of the earlier-in-time image frame 135 as would be appreciated. In some implementations, this may involve storing each of a plurality of pixels that form the improved region (corresponding to the unchanged region) of the earlier-in-time image frame 135 as would be appreciated.

Figure 5:
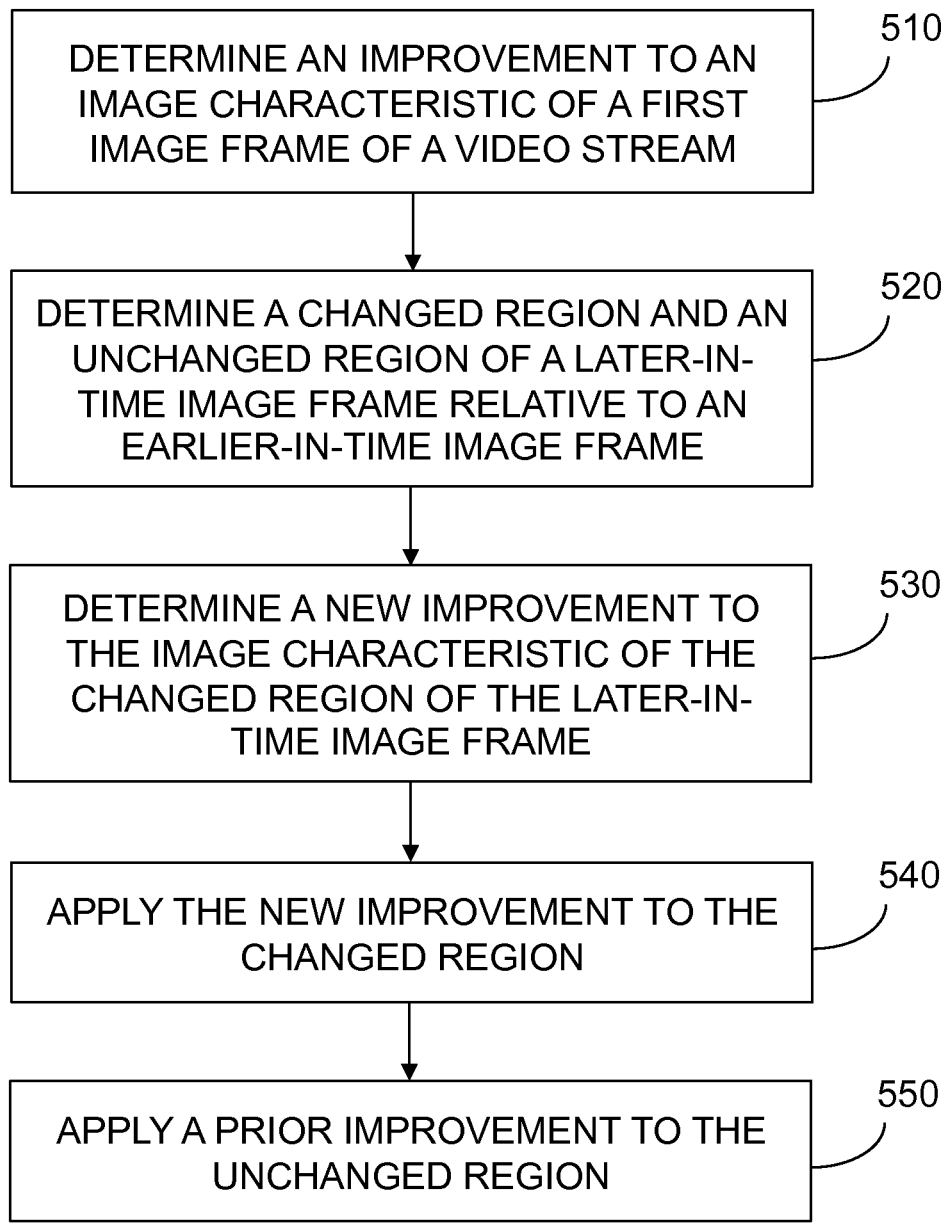
FIG. 5 illustrates an operation of a computing processor that improves an image characteristic of an image frame according to various implementations of the invention.

FIG. 5 illustrates an operation 500 that improves an image characteristic of an image frame 135 according to various implementations of the invention. In an operation 510, computing processor 120 determines an improvement to the image characteristic for an image frame 135 in video stream 130 (e.g., image frame 135$i$). In some implementations of the invention, this improvement is an initial improvement to the image characteristic for the image frame 135. This initial improvement may be computed for a literal first frame in video stream 130 or for a given frame in video stream received after startup, initialization, or other "bootstrapping" or once electronics reach steady state as would be appreciated. In some implementations of the invention, the image characteristic may be determined for an entire image frame 135 without determining whether image frame 135 includes a changed region and an unchanged region. In some implementations of the invention, the image characteristic may be periodically determined (e.g., every minute, every hour, every day, etc.) for an entire image frame 135 without determining whether image frame 135 includes a changed region or an unchanged region. In some implementations of the invention, the image characteristic may be determined for the entire image frame 135 based on changes in content (e.g., a scene change), a number of changed regions in the image frame exceeding a threshold (e.g., 25% of the regions in the image frame are changed regions, etc.), an external trigger (e.g., lights turned off, security system armed, alarm (including a silent alarm) activated, etc.) or other basis for determining the image characteristic for the entire image frame 135. For purposes of this description, image frame 135$i$ is referenced as the frame for which the initial improvement is computed.

In an operation 520, computing processor 120 determines a changed region of a later-in-time image frame 135$j$ of video stream 130 in relation to an earlier-in-time image frame 135$i$ of video stream 130 and an unchanged region of the later-in-time image frame 135$j$ of video stream 130 in relation to the earlier-in-time image frame 135$i$ of video stream 130. In some implementations of the invention, several changed regions of the later-in-time image frame 135$j$ relative to the earlier-in-time image frame 135$i$ may be determined. In some implementations of the invention, several unchanged regions of the later-in-time image frame 135$j$ relative to the earlier-in-time image frame 135$i$ may be determined.

In an operation 530, computing processor 120 determines a new improvement to the image characteristic for the changed region of the later-in-time image frame 135$j$ of video stream 130. In an operation 540, computing processor 130 applies the new improvement to the image characteristic to the changed region of the later-in-time image frame 135$j$ of video stream 130. In an operation 550, computing processor 130 applies a prior improvement to the image characteristic to the unchanged region of the later-in-time image frame 135$j$. In some implementations, the prior improvement is the improvement determined for an earlier-in-time image frame 135, for example, image frame 135$i$. While any prior improvement (or portion thereof may be used), typically, the most recent prior improvement determined for the unchanged region is used. In some implementations of the invention, computing processor 130 applies no improvement to the image characteristic of the unchanged region of the later-in-time image frame 135*j*.

An exemplary application of various aspects of the invention is now described. Adaptive histogram equalization ("AHE") is an image processing technique that may be used to improve a contrast in an image frame. AHE is an adaptive technique in which a histogram is determined for each of several different sections or regions of the image frame. These histograms are then used to redistribute the intensity values of the image. Once the histograms are determined, transformation functions for each region are calculated and applied to the respective region, and more specifically, applied to each of the pixels that form the region. Doing so, improves local contrast in the respective regions of the image frame thereby providing additional detail in the image frame. A variant of AHE known as contrast limited adaptive histogram equalization ("CLAHE") addresses a tendency of AHE to overamplify noise in homogeneous regions of the image frame by limiting an amount of gain applied to such regions. Such image processing techniques are well known.

Conventionally, a new set of CLAHE histograms and a new set of CLAHE transformation functions, or simply "transformations," are determined for each region of each image frame 135 of video stream 130. Such processing on each image frame 135 of video stream 130 is computationally intensive. According to various implementations of the invention, once histograms and/or transformations are determined for a given image frame 135, new histograms and/or new transformations are determined for and applied to changed regions in subsequent image frames 135, while prior histograms and prior transformations are applied to unchanged regions in subsequent image frames 135, thereby dramatically reducing the computational intensity in many instances.

In some implementations of the invention, a new histogram and a new transformation are both determined for and applied to each changed region of subsequent image frame 135 while a prior histogram and a prior transformation are applied to each unchanged region of subsequent image frame 135.

In some implementations of the invention, new histograms may be required for each region of image frame for reasons other than CLAHE (e.g., additional or further image processing techniques). In such implementations, a new transformation is determined for and applied to each changed region of subsequent image frame 135 while a prior transformation is applied to each unchanged region of subsequent image frame 135.

In some implementations of the invention, a new histogram and/or a new transformation is determined for and applied to each changed region of subsequent image frame 135 while the transformed pixels (i.e., pixels to which a transformation function has been applied) of an earlier-in-time image frame 135*i* corresponding to an unchanged region of a later-in-time image frame 135*j* are used to replace the pixels in the later-in-time image frame 135*j*.

According to various implementations of the invention, histograms and/or transformations for each region of image frame 135 may be stored and updated as changes occur in image frames 135 as would be appreciated. In some implementations, histograms may be stored for each region of image frame 135. In some implementations, transformation may be stored for each region of image frame 135. In some implementations, both histograms and transformations may be stored for each region of image frame 135. In some implementations, further or other intermediate calculations or functions may advantageously be stored for each region of image frame 135 as would be appreciated.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A method for improving contrast in a plurality of image frames captured by a video camera, the method comprising:
   generating, by a computing processor, a first transformation function that improves contrast of a first frame of the plurality of image frames, wherein generating the first transformation function that improves contrast of the first frame of the plurality of image frames comprises generating a histogram for the first frame;
   applying, by a computing processor, the first transformation function to the first frame to improve the contrast of the first frame;
   determining, by a computing processor, a changed region in a second frame of the plurality of image frames in relation to the first frame of the plurality of the image frames and an unchanged region of the second frame of the plurality of image frames in relation to the first frame of the plurality of the image frames;
   generating a second transformation function corresponding to the changed region of the second frame;
   applying the second transformation function to the changed region of the second frame to improve the contrast of the changed region; and
   applying the first transformation function to the unchanged region of the first frame to improve the contrast of the unchanged region.

2. The method of claim 1, wherein generating a histogram for the first frame comprises:
   generating a plurality of histograms for the first frame, each of the plurality of histograms corresponding to one of a plurality of regions of the first frame.

3. The method of claim 2, wherein generating a first transformation function that improves contrast of a first frame of the plurality of image frames comprises:
   generating a first plurality of transformation functions, each of the plurality of transformation functions corresponding to one of the plurality of regions of the first frame.

4. A method for improving contrast of a plurality of image frames in a video stream captured by a video camera, the method comprising:
   determining, by a computing processor, a first CLAHE transformation for each of a plurality of regions of an earlier-in-time image frame of the plurality of image frames;
   determining, by the computing processor, a changed region of a later-in-time image frame of the plurality of image frames relative to the earlier-in-time image frame and an unchanged region of the later-in-time image frame of the plurality of image frames relative to the earlier-in-time image frame;
   determining, by the computing processor, a new CLAHE transformation for the changed region of the later-in-time image frame of the plurality of image frames;

applying, by the computing processor, the first CLAHE transformation to the unchanged region of the later-in-time image frame of the plurality of image frames; and applying, by the computing processor, the new CLAHE transformation to the changed region of the later-in-time image frame of the plurality of image frames.

5. A method for improving an image characteristic of a plurality of image frames in a video stream captured by a video camera, the method comprising:

determining, by a computing processor, a first improvement to the image characteristic for a first frame of the plurality of image frames;

determining, by a computing processor, a changed region of a second frame of the plurality of image frames in relation to the first frame of the plurality of the image frames and an unchanged region of the second frame of the plurality of image frames in relation to the first frame of the plurality of the image frames;

determining, by a computing processor, a second improvement to the image characteristic for the changed region of the second frame of the plurality of image frames;

applying, by a computing processor, the first improvement to the image characteristic of the unchanged region of the second frame of the plurality of image frames; and applying, by a computing processor, the second improvement to the image characteristic of the changed region of the second frame of the plurality of image frames.

6. The method of claim 5, wherein determining a first improvement to the image characteristic for a first frame of the plurality of image frames comprises:

generating a first plurality of histograms, each of the first plurality of histograms corresponding to one of a plurality of regions of the first frame of the plurality of image frames.

7. The method of claim 6, wherein each of the plurality of regions comprises a plurality of pixels.

8. The method of claim 6, wherein determining a first improvement to the image characteristic for a first frame of the plurality of image frames further comprises:

generating a plurality of transformation functions, each of the plurality of transformation functions generated from a corresponding one of the first plurality of histograms and associated with a corresponding one of the plurality of regions of the first frame.

9. The method of claim 8, wherein determining a first improvement to the image characteristic for a first frame of the plurality of image frames further comprises:

storing the plurality of transformation functions for the plurality of regions of the first frame as the first improvement.

10. The method of claim 5, wherein determining a changed region of a second frame of the plurality of image frames in relation to the first frame of the plurality of the image frames and an unchanged region of the second frame of the plurality of image frames in relation to the first frame of the plurality of the image frames comprises:

determining a number of pixels in a region of the second frame that exceed a difference threshold relative to corresponding pixels in the first frame in order to determine the changed region.

11. The method of claim 5, wherein determining a changed region of a second frame of the plurality of image frames in relation to the first frame of the plurality of the image frames and an unchanged region of the second frame of the plurality of image frames in relation to the first frame of the plurality of the image frames comprises:

determining a number of pixels in a region of the second frame that differ relative to corresponding pixels in the first frame in order to determine the changed region.

12. The method of claim 5, wherein determining a changed region of a second frame of the plurality of image frames in relation to the first frame of the plurality of the image frames and an unchanged region of the second frame of the plurality of image frames in relation to the first frame of the plurality of the image frames comprises:

determining a motion of a region in the first frame; and
extrapolating the motion of the region to the second frame.

13. The method of claim 5, wherein determining a second improvement to the image characteristic for the changed region of the second frame of the plurality of image frames comprises:

generating a second histogram for the changed region of the second frame.

14. The method of claim 13, wherein determining a second improvement to the image characteristic for the changed region of the second frame of the plurality of image frames further comprises:

generating a second transformation function from the second histogram for the changed region of the second frame.

15. The method of claim 14, wherein applying the second improvement to the image characteristic of the changed region of the second frame of the plurality of image frames comprises:

applying the second transformation function to the changed region of the second frame.

16. The method of claim 15, wherein applying the second transformation function to the changed region of the second frame comprises:

applying the second transformation function to each of a plurality of pixels in the changed region of the second frame.

17. The method of claim 5, wherein determining a first improvement to the image characteristic comprises:

determining at least one intermediate computation; and
storing a result of the at least one intermediate computation; and
wherein applying the first improvement to the image characteristic of the unchanged region of the second frame comprises applying the result of the at least one intermediate computation to the image characteristic of the unchanged region of the second frame.

18. The method of claim 17, wherein the at least one intermediate computation comprises a computationally expensive intermediate computation.

19. The method of claim 5, wherein determining a changed region of a second frame of the plurality of image frames in relation to the first frame of the plurality of the image frames and an unchanged region of the second frame of the plurality of image frames in relation to the first frame of the plurality of the image frames comprises determining that the changed region is due to a change in illumination in the image frame, and wherein determining a second improvement to the image characteristic for the changed region of the second frame of the plurality of image frames comprises determining the second improvement by scaling or shifting the first improvement.

* * * * *